(12) United States Patent
Beard et al.

(10) Patent No.: US 11,971,946 B1
(45) Date of Patent: Apr. 30, 2024

(54) GLOBAL REAL TIME ON DEMAND RENDERING

(71) Applicant: CenterGrid, LLC, Hamilton, OH (US)

(72) Inventors: Chris Beard, Lebanon, OH (US); Brian Powell, Springboro, OH (US)

(73) Assignee: VORA VENTURES, LLC, Blue Ash, OH (US)

( * ) Notice: Subject to any disclaimer, the term of this patent is extended or adjusted under 35 U.S.C. 154(b) by 0 days.

(21) Appl. No.: 18/222,036

(22) Filed: Jul. 14, 2023

(51) Int. Cl.
*G06F 17/00* (2019.01)
*G06F 16/958* (2019.01)
*G06T 15/00* (2011.01)

(52) U.S. Cl.
CPC .......... *G06F 16/972* (2019.01); *G06T 15/005* (2013.01)

(58) Field of Classification Search
None
See application file for complete search history.

(56) References Cited

U.S. PATENT DOCUMENTS

2003/0113038 A1\* 6/2003 Spencer ............... G06F 16/972
                                                            382/305
2017/0365032 A1\* 12/2017 Westerhoff ............. H04L 51/10

\* cited by examiner

*Primary Examiner* — Mustafa A Amin
(74) *Attorney, Agent, or Firm* — Frost Brown Todd LLP (57) ABSTRACT

Real time, on demand rendered image delivery may be provided using one or more local image servers, image stores corresponding to the local image servers, one or more rendering servers, and a global image store. When a request for an image of three dimensional object is provided to a local image server, that server may respond to the request by determining if is present in its corresponding local image store. If it is not, then the local image server may obtain the image, store it in its corresponding local image store, and then return it. The one or more rendering servers may respond to messages indicating that one or the local image servers are obtaining an image by generating that image based on rendering it using special purpose rendering hardware, storing it in the global image store, and sending a completion message indicating that the requested image had been generated.

15 Claims, 6 Drawing Sheets

GLOBAL REAL TIME ON DEMAND RENDERING

FIELD

The technology disclosed herein can be applied to the real time, on demand provision of rendered images, and in particular can be applied to provide websites with dynamic three dimensional images of user customized objects.

BACKGROUND

Creating rendered images from three dimensional models is a computationally intensive process. Even in a single user environment, rendering may tax (or, in some cases, exceed) the capabilities of conventional computer hardware, especially when there is a need for it to be performed in real time—i.e., without user perceptible delay between when a rendered image is needed (e.g., a user request) and when it is presented. When this difficulty is translated to a large scale, multi-user environment, it can push some tasks, such as providing websites with dynamic rendered images of user defined three dimensional objects, entirely out of the reach of conventional technology. Accordingly, there is a need for improvements in computer graphics technology, particularly in the context of real time, on demand image delivery in a networked environment such as the internet.

SUMMARY

Some embodiments of the disclosed technology may be used to address difficulties such as those described above. For example, the disclosed technology may be used to provide a system for real time, on demand rendered image delivery which comprises a routing system, a set of one or more local image servers, and a set of one or more rendering servers. In such a system, the routing system may be configured to respond to a request for an image of a three dimensional object by determining a local image server from the set of one or more local image servers to process the request for the image of the three dimensional object, and sending the request for the image of the three dimensional object to the determined local image server. The local image servers may each be programmed to respond to the request for the image of the three dimensional object by, when the requested image of the three dimensional object is present in an image store corresponding to that local image server, returning the requested image of the three dimensional object from the image store corresponding to that local image server. When the requested image of the three dimensional object is not present in the image store corresponding to that local image server, it may obtain the requested image of the three dimensional object, store the requested image of the three dimensional object in the image store corresponding to that local image server, and return the requested image of the three dimensional object. The set of one or more rendering servers, in turn, may be configured to, based on receiving a message indicating that a requesting local image server is obtaining the requesting image of the three dimensional object, generate the requested image of the three dimensional object based on rendering, using special purpose rendering hardware, a three dimensional model of the three dimensional object. The set of rendering servers may also, after generating the requested image of the three dimensional object, store the requested image of the three dimensional object in a global image store, and send a completion message indicating that the requested image of the three dimensional object has been generated.

The disclosed technology may also be used to provide a message for real time, on demand rendered image delivery. Such a method may comprise determining that a first local image server from a set of local image servers should process a first request for an image of a three dimensional object. In this type of image, the first request for the image of the three dimensional object may be sent to the first local image server. The first local image server may, in response to the first request for the image of the three dimensional object, determine that the requested image of the three dimensional object is not present in an image store corresponding to that local image server. It may also, based on determining that the requested image of the three dimensional object is not present in the image store corresponding to that local image server, obtain the requested image of the three dimensional object, and store the requested image of the three dimensional object in an image store corresponding to that local image server. It may then return the requested image of the three dimensional object. The method may also include receiving, at a set of one or more rendering servers, a request message indicating that a requesting local image server is obtaining the requested image of the three dimensional object and, based on that request message, generating the requested image of the three dimensional object based on rendering, using special purpose rendering hardware, a three dimensional model of the three dimensional object. The set of one or more rendering servers may also, after generating the requested image of the three dimensional object, store the requested image of the three dimensional object in a global image store, and send a completion message indicating that the requested image of the three dimensional object has been generated. Such a method may also include, at the first image server, in response to a second request for the image of the three dimensional object which is received after the first request for the image of the three dimensional object, determine that the requested image of the three dimensional object is present in the image store corresponding to that local image store, and return the requested image of the three dimensional object from the image store corresponding to that local image server.

It should be appreciated that all combinations of the foregoing concepts and additional concepts discussed in greater detail below (provided such concepts are not mutually inconsistent) are contemplated as being part of the inventive subject matter disclosed herein and to achieve the benefits as described herein.

BRIEF DESCRIPTION OF THE DRAWINGS

The details of one or more implementations are set forth in the accompanying drawings and the description below. Other features, aspects, and advantages will become apparent from the description, the drawings, and the claims, in which:

DETAILED DESCRIPTION

Described herein is technology which may be used to provide improved computer graphics in a networked environment. To concretely illustrate how this technology may be implemented and applied, this disclosure provides examples in the context of how the disclosed technology may be used to provide real time rendered images on a motorcycle website. However, it should be understood that these examples are intended to be illustrative only, and that the disclosed technology can be implemented in other manners, and in other contexts, as well. For example, the disclosed technology may be used to provide rendered images to mobile applications rather than websites, and may be used to provide images of objects (e.g., automobiles, shoes, machines, other consumer goods) which may not be included in an motorcycle website. Accordingly, the description and examples set forth herein should not be used to imply limits on the protection provided by either this document or any related document.

Figure 1:
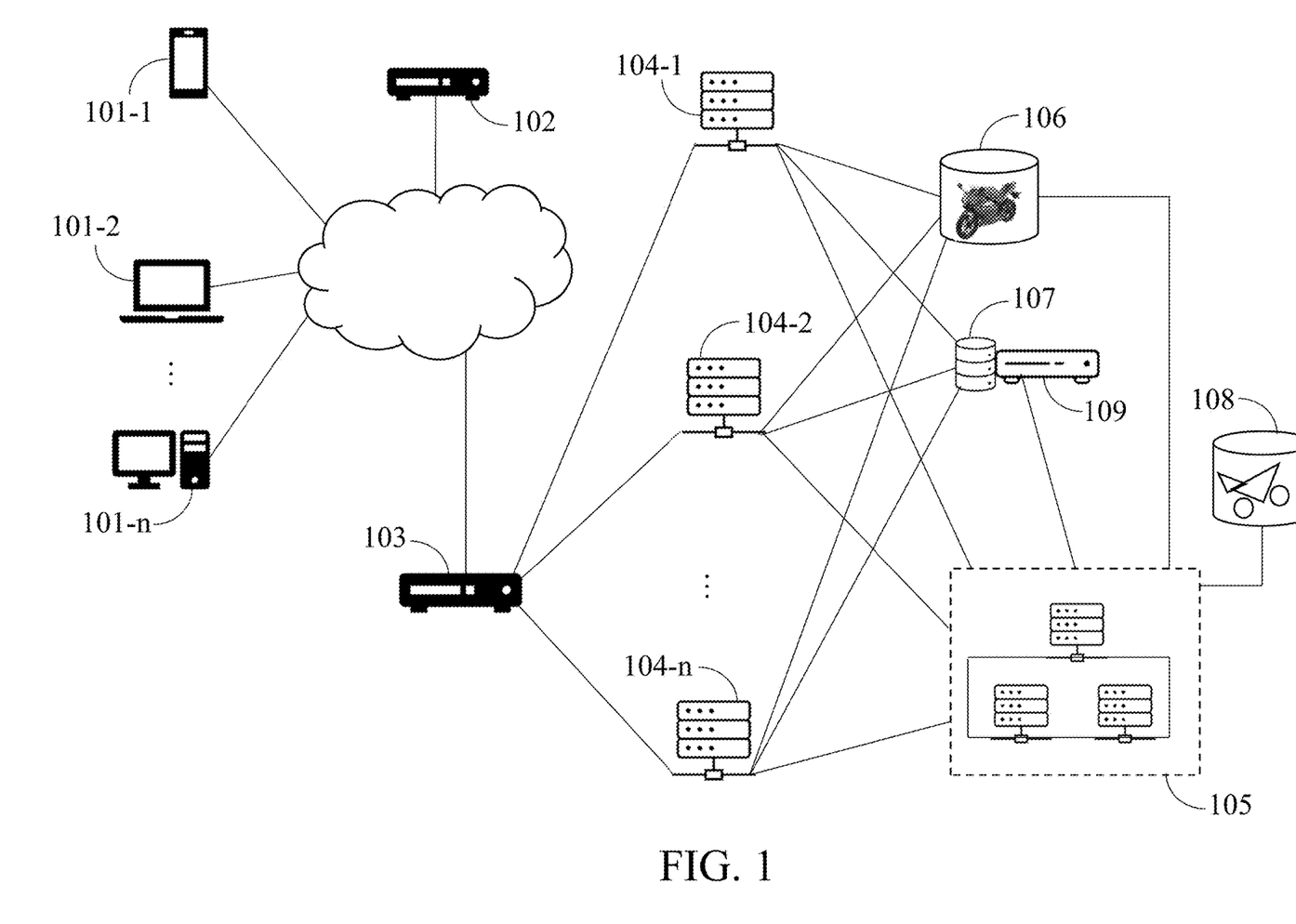
FIG. 1 depicts a simplified illustration of a system which may be used in implementing the disclosed technology.

Turning to the figures, FIG. 1 provides a simplified illustration of a system which may be used in implementing the disclosed technology. As shown in FIG. 1, such a system may include one or more user computers 101-1-101-*n* and a website server 102. When the disclosed technology is deployed, one of the user computers 101-1-101-*n* and the website server 102 may work together to enable a user of the appropriate user computer to submit a request for an image of a three dimensional object. This may be done, for example, by the website server 102 sending website code to the user computer which configures the user computer to present a website which is operable by the user to define the three dimensional object by specifying a base object and a plurality of parameters. An example of such a website is provided by FIG. 2, which shows a website in which a user could select a motorcycle model as a base object, and could specify the color of the motorcycle, any desired add ons for the motorcycle (e.g., drypacks, phone mounts, etc.), and a viewing angle for the image of the motorcycle (e.g., exterior features, indicating an image from a profile such as may be seen by someone seeing the motorcycle when it was ridden by someone else; interior features, indicating an overhead perspective showing the motorcycle as it may be viewed by a rider; etc.) as the plurality of parameters. In some implementations, once the user had defined the three dimensional object, a string representing that object (e.g., a uniform resource locator with a name of a base object, the name(s) of the add ons, and other specified parameters embedded) could be returned from the user's computer, and the string could be treated as a request for the image of the three dimensional object it represents.

Figure 2:
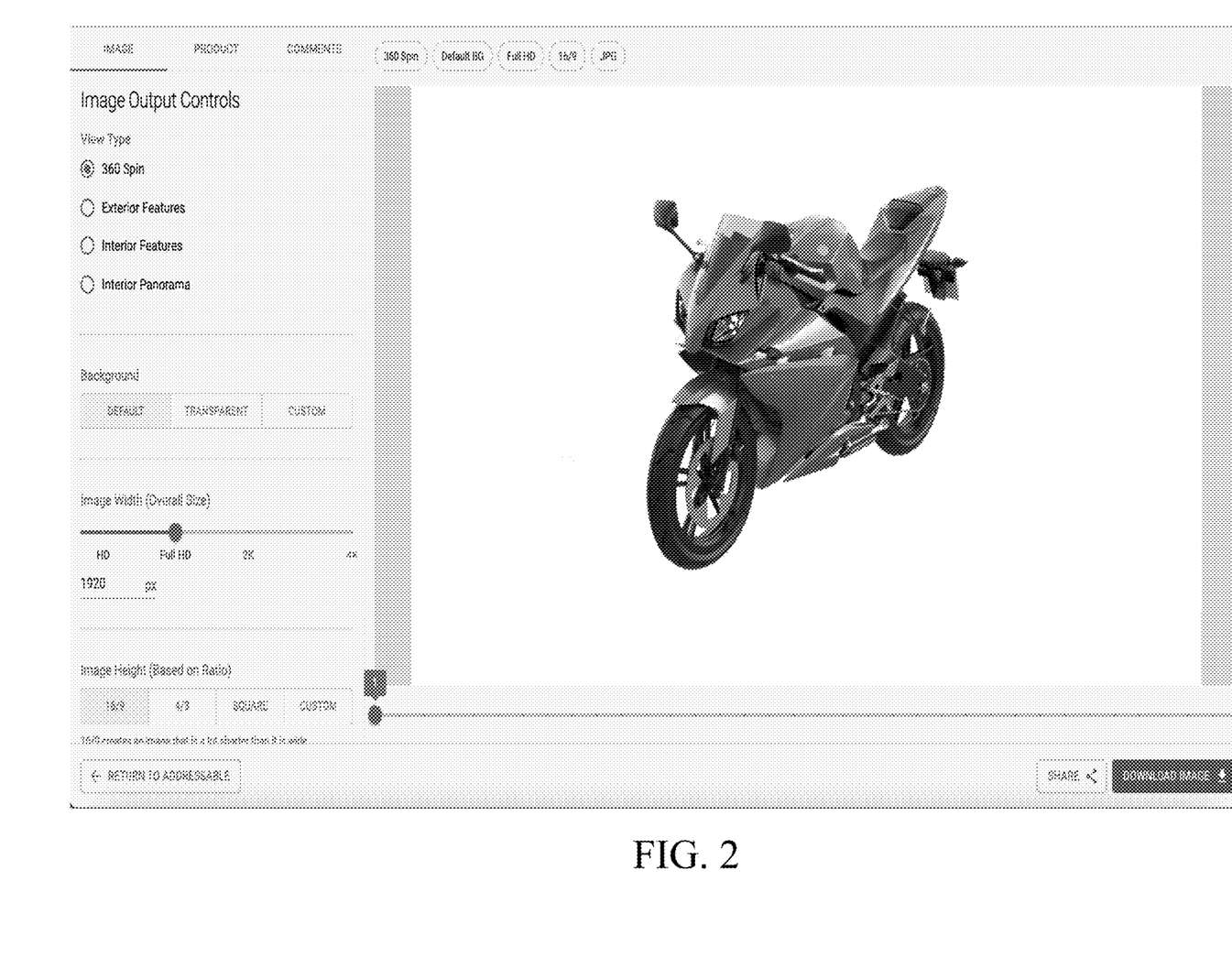
FIG. 2 depicts a website which is operable by a user to define a three dimensional object by specifying a base object and a set of parameters.

In addition to the user computers 101-1-101-*n* and the website server 102, the system of FIG. 1 also includes a routing system 103 (e.g., a load balancer, a routing server, etc.), a set of one or more local image servers 104-1-104-*n* (e.g., a set of image servers which are each allocated to process requests from a particular geographic area), a set of rendering servers 105 (e.g., a server farm which may include multiple physical or virtual servers that can be applied to generate rendered images), and an external image store 106. Using the technology described herein, these components may work together to provide real time, on demand delivery of rendered images, such as images of motorcycles defined using a website as shown in FIG. 2. An example of a method which may be used for this purpose is illustrated in FIG. 3, discussed below.

Figure 3:
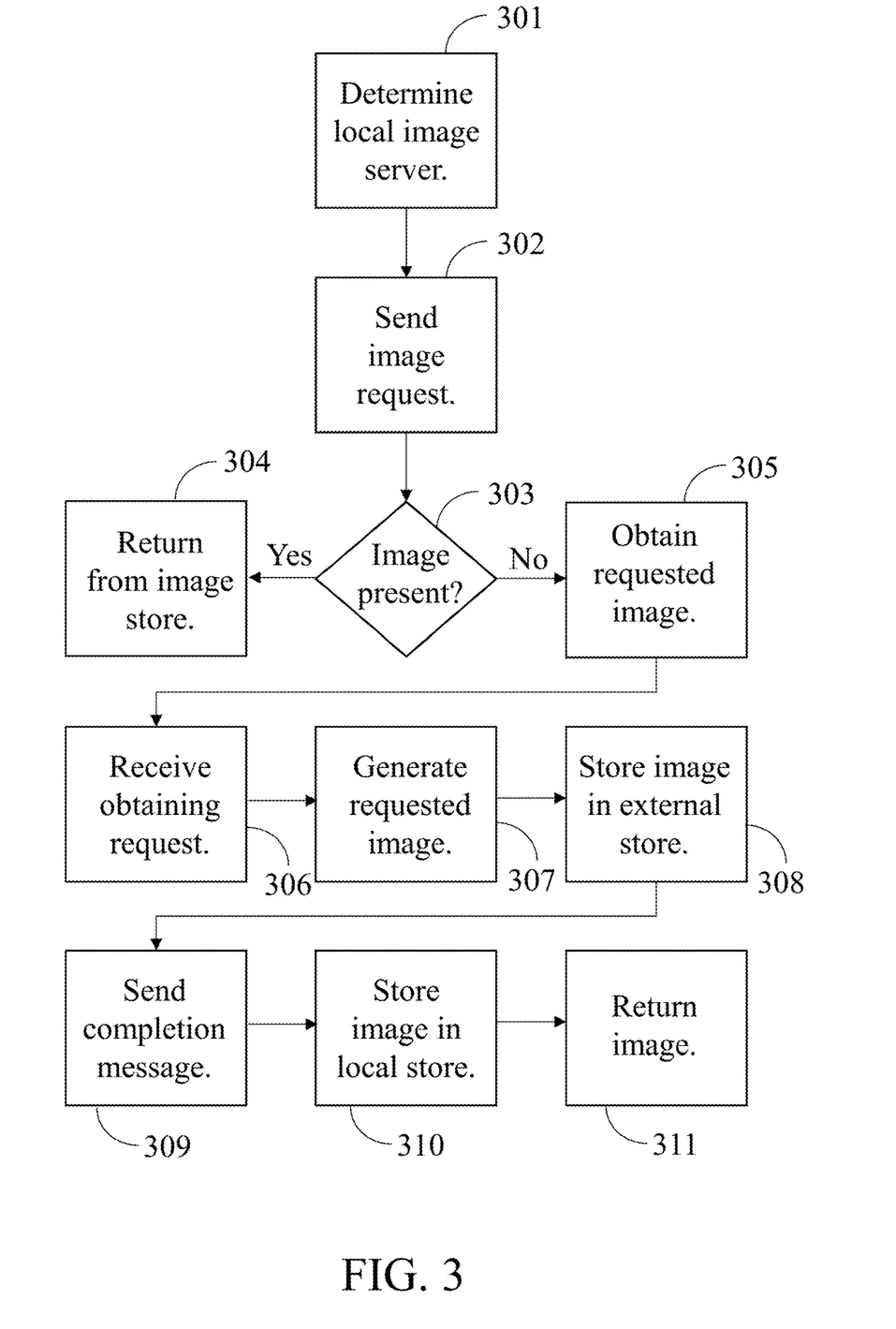
FIG. 3 depicts a method which may be used to provide real time, on demand delivery of rendered images.

As shown in FIG. 3, real time rendered image delivery may begin with a determination 301 of which local image server from the set of one or more local image servers 104-1 to 104-*n* will process a request for an image of a three dimensional object. This may be done, for example, by the routing system 103, in response to receiving a request for an image of a three dimensional object, determining the region from which the request originated (e.g., using an IP address region lookup), and identifying one of the local image servers 104-1 to 104-*n* which was allocated to process requests from that region. Once the determination 301 of the appropriate local image server had been made, the routing system could send 302 the image request to that server, and that local image server could make a determination 303 of whether the requested image was already present in an image store for that server (e.g., by querying a database maintained by, or allocated to the same region as, that local image server). If it was, then the image could simply be returned 304 from that image store. Alternatively, in the event that the image was not present in that image store, then the local image server may obtain 305 the requested image, which may include sending a request for that image to a set of one or more rendering servers 105.

Figure 4:
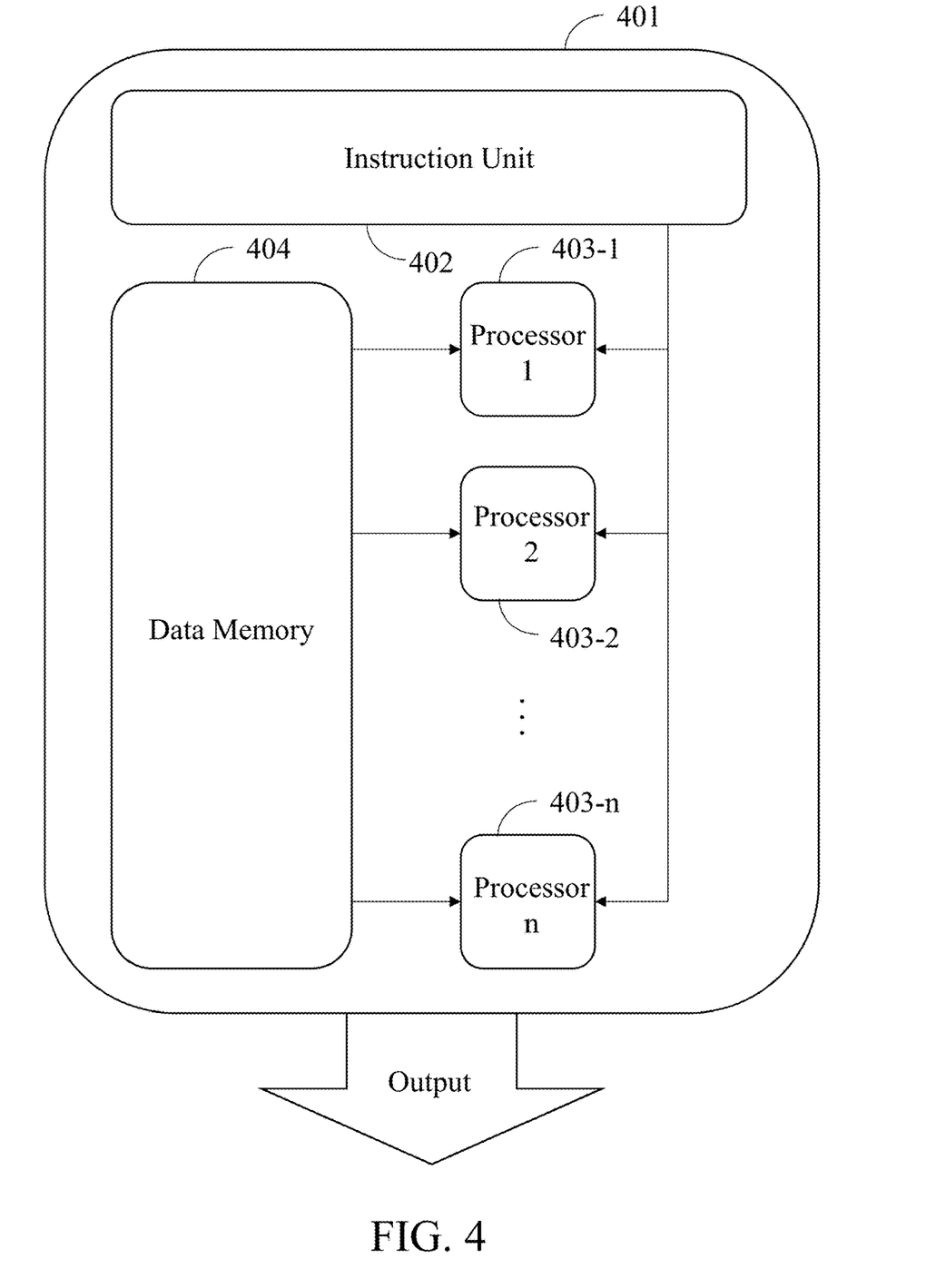
FIG. 4 depicts a multiprocessor unit which may be used in special purpose hardware optimized for creation of rendered images.

When a local image server sends a request to the set of one or more rendering servers 105, the set of rendering servers 105 may, in response to receiving 306 the request, generate 307 the requested image by rendering a three dimensional model of the three dimensional object using special purpose rendering hardware. This special purpose hardware may be optimized for the creation of rendered images through, for example, the inclusion of one or more multiprocessor units 401 such as shown in FIG. 4. In such a multiprocessor unit 401, an instruction unit 402 could provide single instructions in parallel to each of a set of processors 403-1 to 403-*n*. These processors could then simultaneously apply the instruction from the instruction unit 402 to a set of different data items from memory 404. In this way, a single instruction may be loaded and applied to multiple data items in many fewer cycles (e.g., load n data items, apply instruction to each of the n data items), than might be needed if rendering was performed using a conventional central processing unit (CPU) (e.g., load data item 1, apply instruction to data item 1, load data item 2, apply instruction to data item 2, . . . load data item n, apply instruction to data item n). This can be useful in generating rendered images, because many steps of a rendering pipeline include applying the same operations to many different items (e.g., rotating an object by applying the same transformation matrix to each of the vertices which define its outer surface). Of course, it should be understood that other types of special purpose rendering hardware (e.g., graphics processing unit(s), such as the Arc A750 from Intel Corporation) may also be used to create requested images of three dimensional objects, and so the example of FIG. 4 should be understood as being illustrative only, and should not be treated as limiting.

Whatever type of hardware is used in generating 307 the requested image, after the image has been generated it may be stored 308 in a global image store 106, and the set of one or more rendering servers 105 may send 309 a completion message indicating that the requested three dimensional image had been generated. This may be done, for example, by broadcasting, to each of the local image servers 104-1 to 104-*n* a message that the requested image was available in a data store that each of those local image servers could access (e.g., the global image store 106). However it was sent 309, once the local image server received the message, it could proceed to store 310 the requested image in its local image store, and to return it 311 as a response to the original request.

Figure 5:
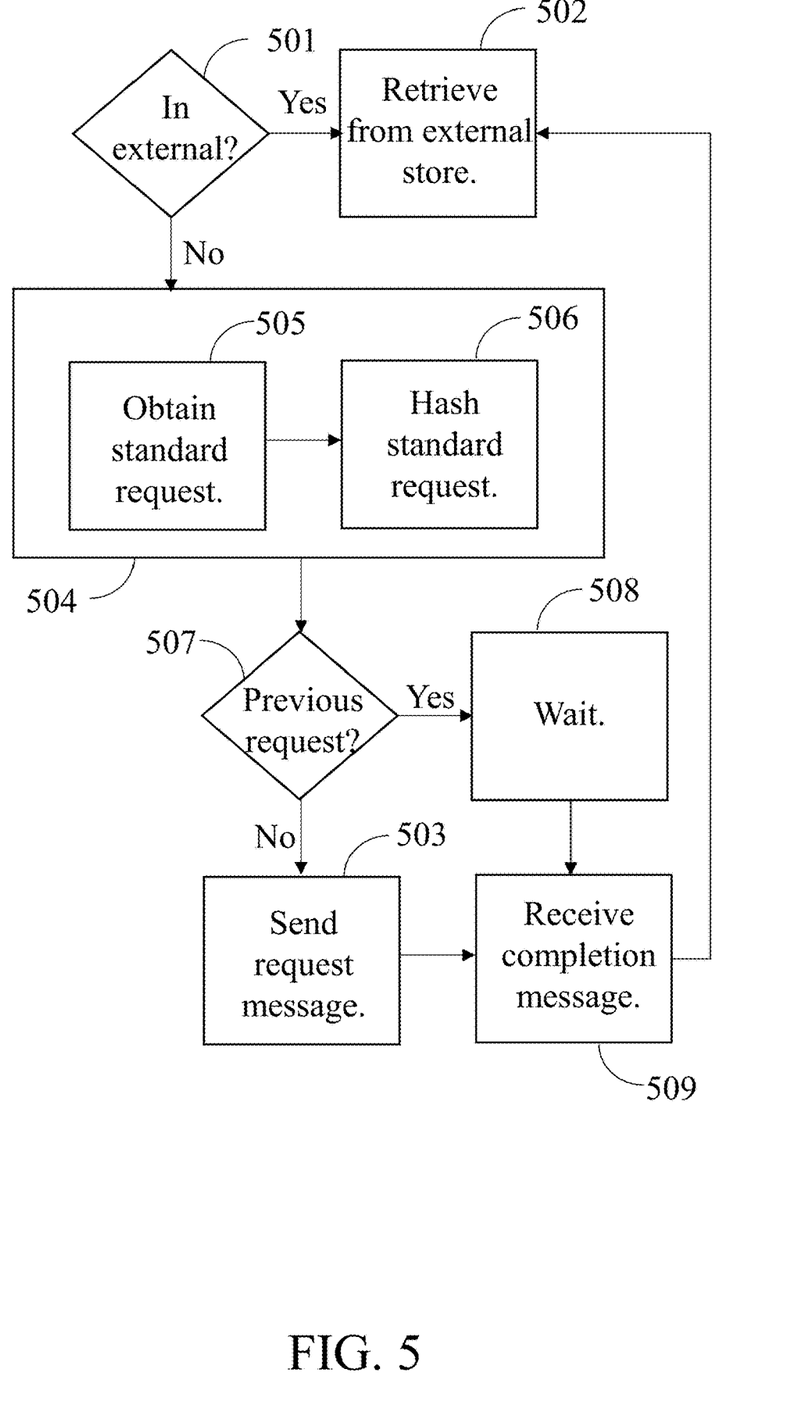
FIG. 5 depicts an approach to obtaining a rendered image.

Other approaches, or variations on the described approaches, may also be used for providing real time on demand rendered image delivery in a system such as that shown in FIG. 1. To illustrate, consider how a local image server may go about obtaining 305 a requested image of a three dimensional object. While this may be done by simply sending a request to the set of rendering servers 105, other approaches are also possible, an example of which is illustrated in FIG. 5. In the approach shown in FIG. 5, when obtaining 305 a requested image, a local image server may begin by making a determination 501 of whether the requested image is available in a global image store 106 (e.g., by sending a query to the global image store asking for the requested image). If the requested image was available in the global image store, then the local image server could simply retrieve 502 the requested image from the global image store 106. Alternatively, if the requested image was not available in the global image store (e.g., if it had not yet been generated), then the local image server may send 503 the request message indicating that the local image server was obtaining the requested image and, in response to that request message, the set of one or more rendering servers 105 could generate 307 the requested image as described previously in the context of FIG. 1.

It is also possible, that, instead of simply sending 503 a message requesting an image, the local image server may take measures to reduce the risk that the set of one or more rendering servers 105 would be flooded with duplicative messages. For example, as shown in FIG. 5, the local image server may generate 504 an identifier for the requested image by obtaining 505 a standardized request (e.g., sorting or otherwise normalizing parameters included in the request for the image of the three dimensional object so that all requests requesting the same image of the same three dimensional object would identical), and then obtaining the identifier by hashing 506 the standardized request. This identifier could then be used along with a lock file stored in a globally accessible memory 107 to determine 507 if a request for the requested image had already been sent (e.g., the identifier could be searched for in the lock file, and, if it was not already present, could be added by the first local image server to request the image so that later potential requestors would find it). In this type of implementation, a local image server could send 503 a request message indicating that it was obtaining the requested image of the three dimensional object only if no such message had already been sent. If such a request message had already been sent (e.g., as indicated in a lock file), the local image server may simply wait 508 (e.g., by adding the request for the image of the three dimensional object to its local memory, and then processing other requests) until it receives 509 the completion message (e.g., a message broadcast by the set of one or more rendering servers 105 when the requested image was available in the global data store, as described in the context of FIG. 3). Once it receives 509 the completion message, a local image server could retrieve 502 the image from the external store, then store 310 it in its corresponding image store and return 311 it as described previously in the context of FIG. 3, with a local image server that had been waiting 508 with multiple requests for an image returning responses to all of the requests once it received 509 the completion message saying that the requested image was available.

Figure 6:
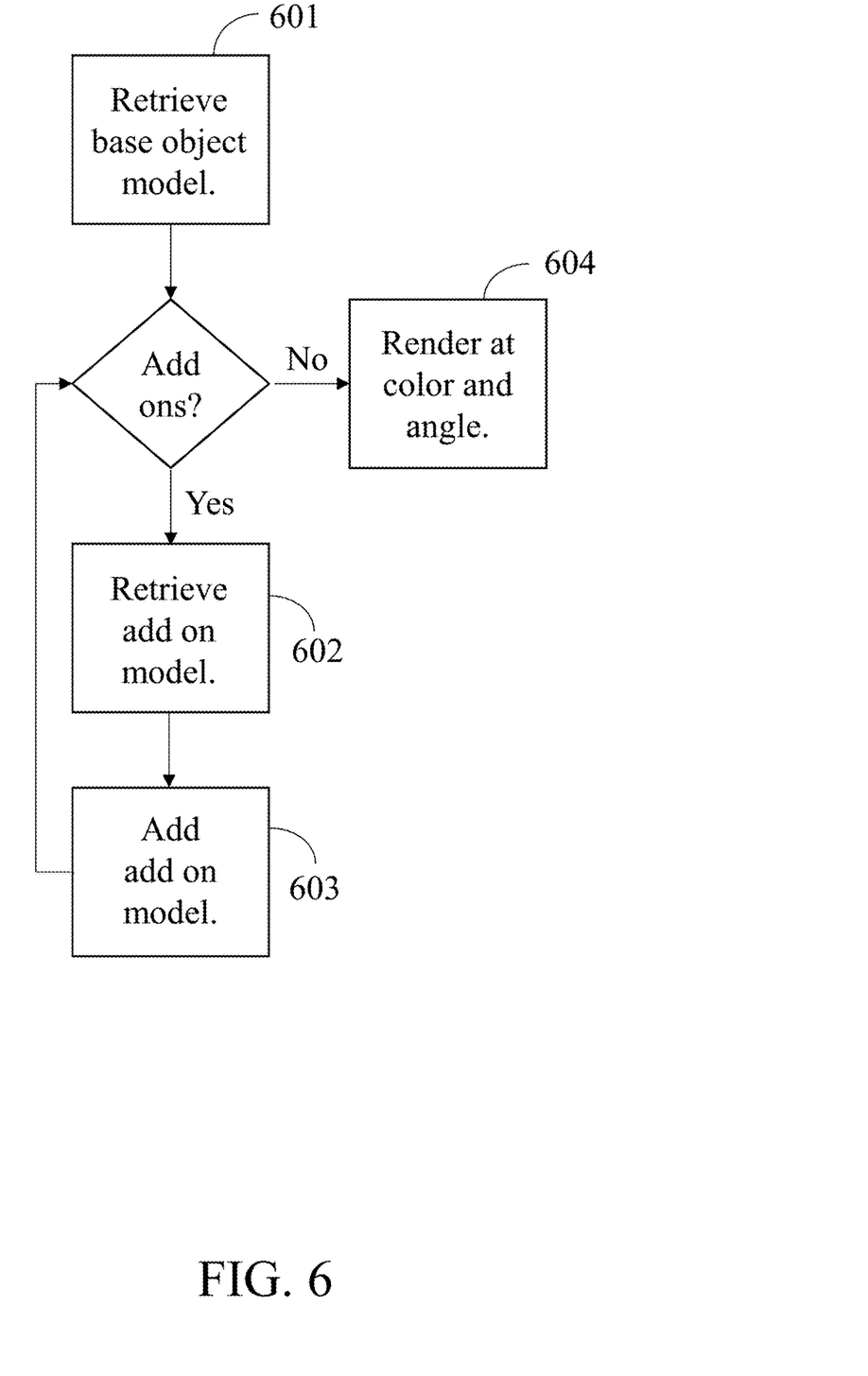
FIG. 6 depicts steps which may be taken by a set of one or more rendering servers when generating a requested image of a three dimensional object.

As another example of a potential variation on approaches which may be taken when implementing the disclosed technology, FIG. 6 illustrates steps which may be taken by a set of one or more rendering servers 105 when generating 307 a requested image of a three dimensional object when that object was defined as a base object and a set of parameters. As shown in FIG. 6, generating a requested image of a three dimensional object may begin with retrieving 601 a three dimensional model of a base object (e.g., a type of motorcycle) from a model store 108. Then, if the parameters for the three dimensional object included an add on (e.g., a drypack for a motorcycle), a three dimensional model for that add on may be retrieved 602 from the model store 108 and that three dimensional model may be added 603 to the three dimensional model for the three dimensional object for which an image was requested (e.g., by compositing the three dimensional model of the base object with the three dimensional model of the add on). This could then be repeated until all add ons had been added, at which point the three dimensional model of the three dimensional object (i.e., the model comprising the model of the base object and models for each of the add ons) could be rendered 604 with the color and at the angle specified in the request.

Other approaches make also be used when generating a requested image of a three dimensional object when that object is defined as a base object and a set of parameters. For example, in some cases, rather than retrieving a base model and adding add ons in response to a request as described in the context of FIG. 6, a model may be created which includes both the base model and add ons in advance, and then portions of that model corresponding to add ons which a user does not select may be turned off to render the object. Similarly, other types of add ons or parameters may also be supported in some cases. For example, in a case where a user is allowed to select a lighted kick plate as an add on, a system implemented based on this disclosure may add a light source to a three dimensional model when that add on is selected, even if the actual contours of the three dimensional model are not impacted. Accordingly, the description above of how add ons can be incorporated into a model of a three dimensional object should be understood as being illustrative only, and should not be treated as limiting.

As described above, this disclosure may be used to implement systems and methods which provide for a variety of optimizations in providing rendered images, including the use of special purpose rendering hardware for optimizing the generation of particular rendered images, and the use of a hierarchical structure with a global image store that avoids redundant image creation. However, other types of optimization approaches may also be used, either in addition to, or as alternatives to, one or more of the optimizations described above. As an example of this, consider the potential for a system implemented based on this disclosure to include functionality for pre-populating rendered images for subsequent requests (e.g., as may be submitted via a website such as discussed in the context of FIG. 2). This may be done by, for example, for each of a plurality of combinations of parameters (e.g., all possible combinations of parameters enumerated for a particular base object), generating a pre-population request (e.g., a URL comprising a base object identification and that combination of parameters), and submitting that pre-population request to the set of one or more rendering servers (e.g., sending the request directly to the set of rendering servers). In this way, when an actual user requested an image of a three dimensional object, providing that image may be performed by retrieving a pre-rendered copy, as opposed to having to render it only in response to the user request.

As another example of a potential optimization, consider the creation of rendered images. In some implementations, particular items of rendering hardware may be allocated to particular types of rendering tasks, such as a first set of GPUs being allocated to creating requested images of a first model of motorcycle, a second set of GPUs being allocated to creating requested images of a second model of motorcycle, etc. In such implementations, there may be provided a computer (e.g., an administrative computer 109) which would maintain the data allocating various items of rendering hardware to corresponding base objects (e.g., models of motorcycles), and which could reallocate rendering hardware from one type of base object to another based on numbers of requests corresponding to those base objects. For example, in a case where initially there were equally sized sets of GPUs for rendering images of different models of motorcycles, if the administrative computer 109 detected that the there were 50% more requests for images of a first type of motorcycle than for images of a second type of motorcycle, the administrative computer 109 could reallocate GPUs from rendering the second type of motorcycle to rendering the first type of motorcycle, thereby reducing the risk that some rendering hardware would be left idle while other rendering hardware was unable to keep up with demand.

Variations on these types of optimizations are also possible, and may be included in some implementations. For example, while it is possible that pre-population may include enumerating all possible combinations of parameters and submitting them directly to a set of rendering servers, it is also possible that combinations of parameters may be generated selectively, and/or submitted to a local image server rather than directly to a set of rendering servers. For instance, images may be pre-populated selectively based on the expected popularity of particular combinations of parameters, and requests for those images may be submitted through local image servers and handled in the same manner as images which may be submitted through a website such as that shown in FIG. 2. As an illustration, if a local image server was used to process requests coming from a region in which mountain biking was very popular, then combinations of parameters which include bicycle rack add ons may be generated and sent through that local image server so that requests for those images could be served from the image store corresponding to that local image server, rather than requiring those images to be retrieved from a global image store or rendered based on the user request. Similarly approaches to selective image pre-population may also be applied to particular base objects. For example, if one model of motorcycle was expected to be more popular in a particular area than another, then images of the more popular model may be pre-populated before images of the less popular model. Other approaches (e.g., interleaved approaches, in which combinations of parameters and models are pre-populated based on their overall popularity rather than pre-populating images based on the popularity of parameter combinations or the popularity of models) are also possible, will be immediately apparent to those of skill in the art, and could be implemented by those of skill in the art in light of this disclosure.

To illustrate another type of variation which may be implemented in some cases, consider how image requests and rendered images may relate to one another. For example, in some cases, when a request is received at a set of one or more rendering servers, those servers may create a single image in response to that request. However, in other cases, when a request is received at a set of rendering servers, those servers may generate the requested image, and may also generate one or more additional images based on the request. For example, when an image is requested, then related images, such as images with adjacent viewing angles, images of with similar colors, etc. may also be generated, so that if those related images are subsequently requested, they would have been pre-populated rather than having to be created only in response to a direct request. It is also possible that, a single request from a user computer may be used to generate multiple requests for image servers and or rendering servers. For example, when a user of a website such as shown in FIG. 2 requests a 360 degree spin representation of a motorcycle, that request may be used to generate multiple image requests, one request for each five degrees in a 360 degree rotation about an axis. Other variations, such as variations in which image requests are stored and analyzed to identify relationships (e.g., that a user who requests an image in red will likely request that same image in blue) and those relationships are then used to selectively pre-populate images before they are requested (e.g., if when a user requests an image of an object in red, then images of that object may be rendered in both red and blue). Accordingly, the description of how images may be created in response to requests should be understood as being illustrative only, and should not be treated as implying limitations on the scope of protection provided by this document or any related document.

It is also possible that the manners in which various components such as those illustrated in FIG. 1 may interact with or be organized relative to each other. For instance, in some cases, when a local image server is obtaining a requested image of a three dimensional object, rather than determining if that image is available in a global image store and, if it is not, requesting it from a set of rendering servers, the local image server may simply request the requested image from a global image server. The global image server may then determine if the image is available in the global image store and, if it is not, may render that image (or may send the request to a set of rendering servers, if there is both a global image server and a separate set of one or more rendering servers). In this way, the actual process of providing the rendered image (e.g., either retrieving it from a global image store or rendering it in the first instance) may be concealed from the local image servers, rather than controlled by the local image servers in a manner such as that described in the context of FIG. 5. As another example, in some cases, each local image server may have its own corresponding image store, and there may be a global image store which is separate from the image stores that correspond to the local image servers. However, in other cases, there may be a set of one or more local image servers which have their own corresponding local image stores, and also another local image server which corresponds to an image store which serves the same role as a comprehensive global image store as a separate server may serve in other implementations. It is also possible that different components in a rendered image provision system may be implemented using the same hardware or using physically separate devices. For example, in some cases, a website server may be implemented as a physically separate device from the local image servers, but in other cases there may be parallel devices serving separate geographic areas, and those devices may be both website servers and local image servers (e.g., implemented as separate virtual machines on a single physical server). Similarly, while it is possible that a globally accessible memory used to store a lock file may be physically separate from a global image store used to store rendered images and/or a model store used to store three dimensional models of base objects and their add ons, it is also possible that one or more of these storage elements may be combined and/or replicated on separate physical devices. Accordingly, exemplary illustrations or descriptions of relationships and configurations of components which may be used to implement aspects of the disclosed technology should be understood as being illustrative only, and should not be treated as limiting.

To further illustrate potential variations on how the disclosed technology may be implemented, the following examples are provided of different systems, methods and machines which may be implemented based on this disclosure.

Example 1

A system for real time, on demand rendered image delivery, the system comprising: a) a routing system, wherein the routing system is configured to respond to a request for an image of a three dimensional object by: i) determining a local image server from a set of one or more local image servers to process the request for the image of the three dimensional object; and ii) sending the request for the image of the three dimensional object to the determined local image server; b) the set of one or more local image servers, wherein each local image server from the set of one or more local image servers is programmed to respond to the request for the image of the three dimensional object by: i) when the requested image of the three dimensional object is present in an image store corresponding to that local image server, returning the requested image of the three dimensional object from the image store corresponding to that local image server; and ii) when the requested image of the three dimensional object is not present in the image store corresponding to that local image server: A) obtaining the requested image of the three dimensional object; B) storing the requested image of the three dimensional object in the image store corresponding to that local image server; and C) returning the requested image of the three dimensional object; and c) a set of one or more rendering servers, wherein the set of rendering servers is configured to, based on receiving a request message indicating that a requesting local image server is obtaining the requested image of the three dimensional object, perform acts comprising: i) generating the requested image of the three dimensional object based on rendering, using special purpose rendering hardware, a three dimensional model of the three dimensional object; and ii) after generating the requested image of the three dimensional object: A) storing the requested image of the three dimensional object in an global image store; and B) sending a completion message indicating that the requested image of the three dimensional object has been generated.

Example 2

The system of example 1, wherein: a) the completion message indicating that the requested image of the three dimensional object has been generated is a message that the requested image of the three dimensional object is available in the global image store; b) sending the completion message indicating that the requested image of the three dimensional object has been generated comprises broadcasting the completion message indicating that the requested image of the three dimensional object has been generated to the set of one or more local image servers; c) each local image server from the set of one or more local image servers is programmed to obtain the requested image of the three dimensional object by performing obtaining acts comprising: i) determining if the requested image of the three dimensional object is available in the global image store; ii) based on determining that the requested image of the three dimensional object is available in the global image store, retrieving the requested image of the three dimensional object from the global image store; iii) based on determining that the requested image of the three dimensional object is not available in the global image store, performing a set of generation acts comprising: A) sending the request message indicating that that local image server is obtaining the requested image of the three dimensional object; and B) based on receiving the completion message indicating that the requested image of the three dimensional object has been generated, retrieving the requested image of the three dimensional object from the global image store.

Example 3

The system of example 2, wherein each local image server from the set of one or more local image servers is programmed to: a) based on determining that the requested image of the three dimensional object is not available in the global image store: i) generate an identifier for the requested image of the three dimensional object; ii) using the identifier for the requested image of the three dimensional object and a lock file stored in a globally accessible memory, determine whether no request message for the requested image of the three dimensional object has previously been sent to the set of one or more rendering servers; and iii) include the request for the image of the three dimensional object in a set of requests in a memory of that local image server; b) only send the request message indicating that that local image server is obtaining the requested image of the three dimensional object if that local image server determines that no request message for the requested image of the three dimensional object has previously been sent to the set of one or more rendering servers; and c) when returning the requested image of the three dimensional object, for each request in the set of requests in the memory that local image server which requests the requested image of the three dimensional object, return a response to that request which comprises the requested image of the three dimensional object.

Example 4

The system of example 3, wherein each local image server from the set of one or more local image servers is programmed to generate the identifier for the requested image of the three dimensional object by performing acts comprising: a) obtaining a standardized request based on sorting a base object and a set of parameters comprised by the request for the image of the three dimensional object; and b) obtaining the identifier for the requested image of the three dimensional object based on hashing the standardized request.

Example 5

The system of example 1, wherein: a) the request for the image of the three dimensional object comprises: i) an identification of a base object; and ii) a plurality of parameters for the three dimensional object, wherein the plurality of parameters comprises a color and a viewing angle; b) the three dimensional model of the three dimensional object comprises a three dimensional model of the base object; and c) rendering the three dimensional model of the three dimensional object using the special purpose rendering hardware comprises rendering the three dimensional model with the color and at the viewing angle comprised by the plurality of parameters.

Example 6

The system of example 5, wherein: a) the plurality of parameters comprised by the request for the image of the three dimensional object comprises a set of add ons; and b) generating the requested image of the three dimensional object comprises generating the three dimensional model of the three dimensional object based on: i) retrieving a three dimensional model of the base object from a model store; and ii) for each add on from the set of add ons, retrieving a three dimensional model of that add on from the model store, and adding the three dimensional model of that add on to the three dimensional model of the three dimensional object.

Example 7

The system of example 5, wherein the system comprises a computer programmed to pre-populate images of the base object by performing acts comprising: a) for each of a plurality of combinations of parameters, generating a pre-population request, wherein the pre-population request comprises the identification of the base object and that combination of parameters; and b) for each of the one or more pre-population requests, submit that pre-population request for the set of one or more rendering servers to generate and store the image requested by that pre-population request in the global image store.

Example 8

The system of example 5, wherein: a) the base object is comprised by a set of base objects having models stored in the model store; b) the system comprises a set of graphics processing units (GPUs); c) the special purpose rendering hardware comprises a GPU from the set of GPUs; d) the system comprises an administrative computer programmed to: i) maintain data allocating each GPU from the set of GPUs to rendering images of models comprising a corresponding base object; and ii) based on numbers of requests for images of models comprising different base objects, reallocate the GPUs from the set of GPUs.

Example 9

The system of example 5, wherein the system comprises one or more website servers programmed to send website code operable to configure a user computer to present a website to a user, wherein the website is operable by the user to define the three dimensional object by specifying the base object and the plurality of parameters.

Example 10

A method for real time, on demand rendered image delivery, the method comprising: a) determining that a first local image server from a set of one or more local image servers should process a first request for an image of a three dimensional object; b) sending the first request for the image of the three dimensional object to the first local image server; c) at the first local image server, in response to the first request for the image of the three dimensional object: i) determining that the requested image of the three dimensional object is not present in an image store corresponding to that local image server; ii) based on determining that the requested image of the three dimensional object is not present in the image store corresponding to that local image server: A) obtaining the requested image of the three dimensional object; and B) storing the requested image of the three dimensional object in the image store corresponding to that local image server; and iii) returning the requested image of the three dimensional object; d) receiving, at a set of one or more rendering servers, a request message indicating that a requesting local image server is obtaining the requested image of the three dimensional object and, based on that request message: i) generating the requested image of the three dimensional object based on rendering, using special purpose rendering hardware, a three dimensional model of the three dimensional object; and ii) after generating the requested image of the three dimensional object: A) storing the requested image of the three dimensional object in a global image store; and B) sending a completion message indicating that the requested image of the three dimensional object has been generated; and e) at the first local image server, in response to a second request for the image of the three dimensional object, wherein the second request for the image of the three dimensional object is received after the first request for the image of the three dimensional object: i) determining that the requested image of the three dimensional object is present in the image store corresponding to that local image server; ii) returning the requested image of the three dimensional object from the image store corresponding to that local image server.

Example 11

The method of example 10, wherein: a) the completion message indicating that the requested image of the three dimensional object has been generated is a message that the requested image of the three dimensional object is available in the global image store; b) sending the completion message indicating that the requested image of the three dimensional object has been generated comprises broadcasting the completion message indicating that the requested image of the three dimensional object has been generated to the set of one or more local image servers; c) each local image server from the set of one or more local image servers is programmed to obtain the requested image of the three dimensional object by performing obtaining acts comprising: i) determining if the requested image of the three dimensional object is available in the global image store; ii) based on determining that the requested image of the three dimensional object is available in the global image store, retrieving the requested image of the three dimensional object from the global image store; iii) based on determining that the requested image of the three dimensional object is not available in the global image store, performing a set of generation acts comprising: A) sending the request message indicating that that local image server is obtaining the requested image of the three dimensional object; and B) based on receiving the completion message indicating that the requested image of the three dimensional object has been generated, retrieving the requested image of the three dimensional object from the global image store.

Example 12

The method of example 11, wherein: a) the method comprises the first local image server: i) determining, based on the first request for the image of the three dimensional object, that the requested image of the three dimensional object is not available in the global image store; ii) based on determining that the requested image of the three dimensional object is not available in the global image store: A) generating an identifier for the requested image of the three dimensional object; B) using the identifier for the requested image of the three dimensional object and a lock file stored in a globally accessible memory, determining whether no request message for the requested image of the three dimensional object has previously been sent to the set of one or more rendering servers; and C) including the first request for the image of the three dimensional object in a set of requests in a memory of that local image server; iii) when returning the requested image of the three dimensional object, for each request in the set of requests in the memory the first local image server which requests the requested image of the three dimensional object, return a response to that request which comprises the requested image of the three dimensional object; b) each local image server from the set of one or more local image servers is programmed to only send the request message indicating that that local image server is obtaining the requested image of the three dimensional object if that local image server determines that no request message for the requested image of the three dimensional object has previously been sent to the set of one or more rendering servers.

Example 13

The method of example 12, wherein each local image server from the set of one or more local image servers is programmed to generate the identifier for the requested image of the three dimensional object by performing acts comprising: a) obtaining a standardized request based on sorting a base object and a set of parameters comprised by the request for the image of the three dimensional object; and b) obtaining the identifier for the requested image of the three dimensional object based on hashing the standardized request.

Example 14

The method of example 10, wherein: a) the first request for the image of the three dimensional object comprises: i) an identification of a base object; and ii) a plurality of parameters for the three dimensional object, wherein the plurality of parameters comprises a color and a viewing angle; b) the three dimensional model of the three dimensional object comprises a three dimensional model of the base object; and c) rendering the three dimensional model of the three dimensional object using the special purpose rendering hardware comprises rendering the three dimensional model with the color and at the viewing angle comprised by the plurality of parameters.

Example 15

The method of example 14, wherein: a) the plurality of parameters comprised by the request for the image of the three dimensional object comprises a set of add ons; and b) generating the requested image of the three dimensional object comprises generating the three dimensional model of the three dimensional object based on: i) retrieving a three dimensional model of the base object from a model store; and ii) for each add on from the set of add ons, retrieving a three dimensional model of that add on from the model store, and adding the three dimensional model of that add on to the three dimensional model of the three dimensional object.

Example 16

The method of example 14, wherein the method comprises pre-populating images of the base object by performing acts comprising: a) for each of a plurality of combinations of parameters, generating a pre-population request, wherein the pre-population request comprises the identification of the base object and that combination of parameters; and b) for each of the one or more pre-population requests, submit that pre-population request for the set of one or more rendering servers to generate and store the image requested by that pre-population request in the global image store.

Example 17

The method of example 14, wherein: a) the base object is comprised by a set of base objects having models stored in a model store; b) the special purpose rendering hardware comprises a GPU from a set of GPUs; c) the method comprises: i) maintaining data allocating each GPU from the set of GPUs to rendering images of models comprising a corresponding base object; and ii) based on numbers of requests for images of models comprising different base objects, reallocating the GPUs from the set of GPUs.

Example 18

The method of example 14, wherein the method comprises sending website code to a user computer, wherein the website code is operable to configure the user computer to present a website to a user, wherein the website is operable by the user to define the three dimensional object by specifying the base object and the plurality of parameters.

Example 19

The method of example 10, wherein the method comprises: a) determining that a second local image server from the set of one or more local image servers should process a subsequent request for the image of the three dimensional object; b) sending the subsequent request for the image of the three dimensional object to the second local image server; and c) at the second local image server, in response to the subsequent request for the image of the three dimensional object: i) determining that the requested image of the three dimensional object is not present in an image store comprised by that local image server; ii) based on determining that the requested image of the three dimensional object is not present in the image store comprised by that local image server, obtaining the requested image of the three dimensional object from the external file store; iii) adding the requested image of the three dimensional object to the image store comprised by that local image server; and iv) returning the requested image of the three dimensional object.

Example 20

A machine comprising: a) a website server, wherein the website server is programmed to send website code operable to configure a user computer to present a website to a user, wherein the website is operable by the user generate image requests; and b) means for real time, on demand delivery of rendered images.

In light of the potential for different approaches to be used in implementing the disclosed technology, the protection provided by this document or by other documents which claim the benefit of this disclosure should not be understood as being limited to the configurations, features, interactions or other aspects of the examples provided herein. Instead, the protection provided by this document or other related documents should be understood as being defined by the claims in such documents when the terms in those claims which are provided in a section labeled "Explicit Definitions" are given their explicit definitions, and other terms are given their broadest reasonable interpretations as provided by a general purpose dictionary.

Explicit Definitions

Throughout this specification and the claims which follow, unless the context requires otherwise, the word "comprise", and variations such as "comprises" and "comprising" means various components may be co-jointly employed in the methods and articles (e.g., compositions and apparatuses including device and methods). For example, the term "comprising" will be understood to imply the inclusion of any stated elements or steps but not the exclusion of any other elements or steps. In general, any of the apparatuses and methods described herein should be understood to be inclusive, but all or a sub-set of the components and/or steps may alternatively be exclusive and may be expressed as "consisting of" or alternatively "consisting essentially of" the various components, steps, sub-components, or sub-steps.

Although the terms "first" and "second" may be used herein to describe various features/elements (including steps), these features/elements should not be limited by these terms, unless the context indicates otherwise. These terms are used to distinguish one feature/element from another feature/element, and unless specifically pointed out, do not denote a certain order. Thus, a first feature/element discussed below could be termed a second feature/element, and similarly, a second feature/element discussed below could be termed a first feature/element without departing from the teachings of the present invention. Similarly, while various computing devices may be described using terms such as "server," "computer," etc., the use of such different terms should not be treated as requiring physical differences between devices, and should instead be understood as simply being used to increase the readability of this document.

As used herein, a statement that something is "based on" something else should be understood as meaning that the thing is determined at least in part by what it is identified as being "based on." When something necessarily is required to be completely determined by something else, it is described as being "based EXCLUSIVELY on" whatever it is completely determined by.

When used in the claims, the phrase "means for real time, on demand delivery of rendered images" should be understood as a limitation set forth in means plus function form as provided for in 35 U.S.C. § 112(f), in which the function is "real time, on demand delivery of rendered images" and the corresponding structure is a routing system, a set of local image servers, and a set of one or more rendering servers with special purpose rendering hardware as well as their corresponding image stores as illustrated in FIG. 1 which are programmed as described in the corresponding description and illustrated in FIGS. 3, 5 and 6.

As used herein, "set" means a number, group, or combination of zero or more elements of similar nature, design, or function. It should be understood that a "subset" or a "superset" of a set are not necessarily smaller, or larger, respectively, than the set which they are contained by or which they contain.

What is claimed is:

1. A method for on demand rendered image delivery, the method comprising:
   a) determining that a first local image server from a set of one or more local image servers should process a first request for an image of a three dimensional object;
   b) sending the first request for the image of the three dimensional object to the first local image server;
   c) at the first local image server, in response to the first request for the image of the three dimensional object:
      i) determining that the requested image of the three dimensional object is not present in an image store corresponding to that local image server;
      ii) based on determining that the requested image of the three dimensional object is not present in the image store corresponding to that local image server:
         A) obtaining the requested image of the three dimensional object; and
         B) storing the requested image of the three dimensional object in the image store corresponding to that local image server;
      and
      iii) returning the requested image of the three dimensional object;
   d) receiving, at a set of one or more rendering servers, a request message indicating that a requesting local image server is obtaining the requested image of the three dimensional object and, based on that request message:
      i) generating the requested image of the three dimensional object based on rendering, using special purpose rendering hardware, a three dimensional model of the three dimensional object; and
      ii) after generating the requested image of the three dimensional object:
         A) storing the requested image of the three dimensional object in a global image store; and
         B) sending a completion message indicating that the requested image of the three dimensional object has been generated;
      and
   e) at the first local image server, in response to a second request for the image of the three dimensional object, wherein the second request for the image of the three dimensional object is received after the first request for the image of the three dimensional object:
      i) determining that the requested image of the three dimensional object is present in the image store corresponding to that local image server;
      ii) returning the requested image of the three dimensional object from the image store corresponding to that local image server;
   wherein:
   A) the completion message indicating that the requested image of the three dimensional object has been generated is a message that the requested image of the three dimensional object is available in the global image store;

B) sending the completion message indicating that the requested image of the three dimensional object has been generated comprises broadcasting the completion message indicating that the requested image of the three dimensional object has been generated to the set of one or more local image servers;

C) each local image server from the set of one or more local image servers is programmed to obtain the requested image of the three dimensional object by performing obtaining acts comprising:
  I) determining if the requested image of the three dimensional object is available in the global image store;
  II) based on determining that the requested image of the three dimensional object is available in the global image store, retrieving the requested image of the three dimensional object from the global image store;
  III) based on determining that the requested image of the three dimensional object is not available in the global image store, performing a set of generation acts comprising:
    a) sending the request message indicating that that local image server is obtaining the requested image of the three dimensional object; and
    b) based on receiving the completion message indicating that the requested image of the three dimensional object has been generated, retrieving the requested image of the three dimensional object from the global image store;

D) the method comprises the first local image server:
  I) determining, based on the first request for the image of the three dimensional object, that the requested image of the three dimensional object is not available in the global image store;
  II) based on determining that the requested image of the three dimensional object is not available in the global image store:
    a) generating an identifier for the requested image of the three dimensional object;
    b) using the identifier for the requested image of the three dimensional object and a lock file stored in a globally accessible memory, determining whether no request message for the requested image of the three dimensional object has previously been sent to the set of one or more rendering servers; and
    c) including the first request for the image of the three dimensional object in a set of requests in a memory of that local image server:
  III) when returning the requested image of the three dimensional object, for each request in the set of requests in the memory the first local image server which requests the requested image of the three dimensional object, return a response to that request which comprises the requested image of the three dimensional object;

E) each local image server from the set of one or more local image servers is programmed to only send the request message indicating that that local image server is obtaining the requested image of the three dimensional object based on that local image server determining that no request message for the requested image of the three dimensional object has previously been sent to the set of one or more rendering servers.

2. The method of claim 1, wherein each local image server from the set of one or more local image servers is programmed to generate the identifier for the requested image of the three dimensional object by performing acts comprising:
  a) obtaining a standardized request based on sorting a base object and a set of parameters comprised by the request for the image of the three dimensional object; and
  b) obtaining the identifier for the requested image of the three dimensional object based on hashing the standardized request.

3. The method of claim 1, wherein:
  a) the first request for the image of the three dimensional object comprises:
    i) an identification of a base object; and
    ii) a plurality of parameters for the three dimensional object, wherein the plurality of parameters comprises a color and a viewing angle;
  b) the three dimensional model of the three dimensional object comprises a three dimensional model of the base object; and
  c) rendering the three dimensional model of the three dimensional object using the special purpose rendering hardware comprises rendering the three dimensional model with the color and at the viewing angle comprised by the plurality of parameters.

4. The method of claim 3, wherein:
  a) the plurality of parameters comprised by the request for the image of the three dimensional object comprises a set of add ons; and
  b) generating the requested image of the three dimensional object comprises generating the three dimensional model of the three dimensional object based on:
    i) retrieving a three dimensional model of the base object from a model store; and
    ii) for each add on from the set of add ons, retrieving a three dimensional model of that add on from the model store, and adding the three dimensional model of that add on to the three dimensional model of the three dimensional object.

5. The method of claim 3, wherein the method comprises pre-populating images of the base object by performing acts comprising:
  a) for each of a plurality of combinations of parameters, generating a pre-population request, wherein the pre-population request comprises the identification of the base object and that combination of parameters; and
  b) for each of the one or more pre-population requests, submit that pre-population request for the set of one or more rendering servers to generate and store the image requested by that pre-population request in the global image store.

6. The method of claim 3, wherein:
  a) the base object is comprised by a set of base objects having models stored in a model store;
  b) the special purpose rendering hardware comprises a GPU from a set of GPUs;
  c) the method comprises:
    i) maintaining data allocating each GPU from the set of GPUs to rendering images of models comprising a corresponding base object; and
    ii) based on numbers of requests for images of models comprising different base objects, reallocating the GPUs from the set of GPUs.

7. The method of claim 3, wherein the method comprises sending website code to a user computer, wherein the website code is operable to configure the user computer to present a website to a user, wherein the website is operable by the user to define the three dimensional object by specifying the base object and the plurality of parameters.

8. The method of claim 1, wherein the method comprises:
   a) determining that a second local image server from the set of one or more local image servers should process a subsequent request for the image of the three dimensional object;
   b) sending the subsequent request for the image of the three dimensional object to the second local image server; and
   c) at the second local image server, in response to the subsequent request for the image of the three dimensional object:
      i) determining that the requested image of the three dimensional object is not present in an image store comprised by that local image server;
      ii) based on determining that the requested image of the three dimensional object is not present in the image store comprised by that local image server, obtaining the requested image of the three dimensional object from the external file store;
      iii) adding the requested image of the three dimensional object to the image store comprised by that local image server; and
      iv) returning the requested image of the three dimensional object.

9. A system for on demand rendered image delivery, the system comprising:
   a) a routing system, wherein the routing system is configured to respond to a request for an image of a three dimensional object by:
      i) determining a local image server from a set of one or more local image servers to process the request for the image of the three dimensional object; and
      ii) sending the request for the image of the three dimensional object to the determined local image server;
   b) the set of one or more local image servers, wherein each local image server from the set of one or more local image servers is programmed to respond to the request for the image of the three dimensional object by:
      i) when the requested image of the three dimensional object is present in an image store corresponding to that local image server, returning the requested image of the three dimensional object from the image store corresponding to that local image server; and
      ii) when the requested image of the three dimensional object is not present in the image store corresponding to that local image server:
         A) obtaining the requested image of the three dimensional object;
         B) storing the requested image of the three dimensional object in the image store corresponding to that local image server; and
         C) returning the requested image of the three dimensional object;
      and
   c) a set of one or more rendering servers, wherein the set of rendering servers is configured to, based on receiving a request message indicating that a requesting local image server is obtaining the requested image of the three dimensional object, perform acts comprising:
      i) generating the requested image of the three dimensional object based on rendering, using special purpose rendering hardware, a three dimensional model of the three dimensional object; and
      ii) after generating the requested image of the three dimensional object:
         A) storing the requested image of the three dimensional object in an global image store; and
         B) sending a completion message indicating that the requested image of the three dimensional object has been generated;
   wherein:
   A) the completion message indicating that the requested image of the three dimensional object has been generated is a message that the requested image of the three dimensional object is available in the global image store;
   B sending the completion message indicating that the requested image of the three dimensional object has been generated comprises broadcasting the completion message indicating that the requested image of the three dimensional object has been generated to the set of one or more local image servers;
   C) each local image server from the set of one or more local image servers is programmed to obtain the requested image of the three dimensional object by performing obtaining acts comprising:
      I) determining if the requested image of the three dimensional object is available in the global image store;
      II) based on determining that the requested image of the three dimensional object is available in the global image store, retrieving the requested image of the three dimensional object from the global image store;
      II) based on determining that the requested image of the three dimensional object is not available in the global image store, performing a set of generation acts comprising:
         a) sending the request message indicating that that local image server is obtaining the requested image of the three dimensional object; and
         b) based on receiving the completion message indicating that the requested image of the three dimensional object has been generated, retrieving the requested image of the three dimensional object from the global image store;
      and
   D) each local image server from the set of one or more local image servers is programmed to:
      I) based on determining that the requested image of the three dimensional object is not available in the global image store:
         a) generate an identifier for the requested image of the three dimensional object:
         b) using the identifier for the requested image of the three dimensional object and a lock file stored in a globally accessible memory, determine whether no request message for the requested image of the three dimensional object has previously been sent to the set of one or more rendering servers; and
         c) include the request for the image of the three dimensional object in a set of requests in a memory of that local image server:

II) only send the request message indicating that that local image server is obtaining the requested image of the three dimensional object if that local image server determines that no request message for the requested image of the three dimensional object has previously been sent to the set of one or more rendering servers; and III) when returning the requested image of the three dimensional object, for each request in the set of requests in the memory that local image server which requests the requested image of the three dimensional object, return a response to that request which comprises the requested image of the three dimensional object.

10. The system of claim 1, wherein each local image server from the set of one or more local image servers is programmed to generate the identifier for the requested image of the three dimensional object by performing acts comprising:
  a) obtaining a standardized request based on sorting a base object and a set of parameters comprised by the request for the image of the three dimensional object; and
  b) obtaining the identifier for the requested image of the three dimensional object based on hashing the standardized request.

11. The system of claim 1, wherein:
a) the request for the image of the three dimensional object comprises:
  i) an identification of a base object; and
  ii) a plurality of parameters for the three dimensional object, wherein the plurality of parameters comprises a color and a viewing angle;
b) the three dimensional model of the three dimensional object comprises a three dimensional model of the base object; and
c) rendering the three dimensional model of the three dimensional object using the special purpose rendering hardware comprises rendering the three dimensional model with the color and at the viewing angle comprised by the plurality of parameters.

12. The system of claim 11, wherein:
a) the plurality of parameters comprised by the request for the image of the three dimensional object comprises a set of add ons; and
b) generating the requested image of the three dimensional object comprises generating the three dimensional model of the three dimensional object based on:
  i) retrieving a three dimensional model of the base object from a model store; and
  ii) for each add on from the set of add ons, retrieving a three dimensional model of that add on from the model store, and adding the three dimensional model of that add on to the three dimensional model of the three dimensional object.

13. The system of claim 11, wherein the system comprises a computer programmed to pre-populate images of the base object by performing acts comprising:
  a) for each of a plurality of combinations of parameters, generating a pre-population request, wherein the pre-population request comprises the identification of the base object and that combination of parameters; and
  b) for each of the one or more pre-population requests, submit that pre-population request for the set of one or more rendering servers to generate and store the image requested by that pre-population request in the global image store.

14. The system of claim 11, wherein:
a) the base object is comprised by a set of base objects having models stored in the model store;
b) the system comprises a set of graphics processing units (GPUs);
c) the special purpose rendering hardware comprises a GPU from the set of GPUs;
d) the system comprises an administrative computer programmed to:
  i) maintain data allocating each GPU from the set of GPUs to rendering images of models comprising a corresponding base object; and
  ii) based on numbers of requests for images of models comprising different base objects, reallocate the GPUs from the set of GPUs.

15. The system of claim 11, wherein the system comprises one or more website servers programmed to send website code operable to configure a user computer to present a website to a user, wherein the website is operable by the user to define the three dimensional object by specifying the base object and the plurality of parameters.

* * * * *